United States Patent [19]

Galetto et al.

[11] 4,075,636

[45] Feb. 21, 1978

[54] BI-DIRECTIONAL DOT MATRIX PRINTER WITH SLANT CONTROL

[75] Inventors: Louis Valentine Galetto, Apalachin; Johann Hans Meier; Walter Thornton Pimbley, both of Vestal; Bruce Allen Wolfe, Johnson City, all of N.Y.

[73] Assignee: International Business Machines Corporation, Armonk, N.Y.

[21] Appl. No.: 751,235

[22] Filed: Dec. 16, 1976

[51] Int. Cl.[2] .............. G01D 15/18

[52] U.S. Cl. .............. 346/75; 197/1 R

[58] Field of Search .............. 346/75; 197/1 R

[56] References Cited

U.S. PATENT DOCUMENTS

| | | | |
|---|---|---|---|
| 3,708,050 | 1/1973 | McCarthy, Jr. | 197/1 R |
| 3,787,884 | 1/1974 | Demer | 346/75 |
| 3,814,227 | 6/1974 | Hurd et al. | 197/1 R |
| 3,882,988 | 5/1975 | Sloan et al. | 197/1 R X |
| 3,938,163 | 2/1976 | Fujimoto et al. | 346/75 |
| 4,015,267 | 3/1977 | Kasubuchi et al. | 346/75 X |

*Primary Examiner*—George H. Miller, Jr.
*Attorney, Agent, or Firm*—John S. Gasper

[57] ABSTRACT

A dot matrix printer apparatus has a magnetic ink jet recording head which projects a continuous stream of ferro-fluid ink drops toward a print medium. The ink drops are rastered in the direction orthogonal to the direction of relative motion of the recording head and the print medium to form characters from columns of dots. The slant of the characters caused by the change in direction of relative motion is controlled by reversing the direction or sequence of rastering of ink drops when the direction of printing reverses.

14 Claims, 6 Drawing Figures

BI-DIRECTIONAL DOT MATRIX PRINTER WITH SLANT CONTROL

BACKGROUND OF THE INVENTION

1. Field of the Invention

This invention relates to serial printing and particularly to serial matrix printers in which dot matrix symbols are formed by rastering.

2. Description of the Prior Art

In serial printers of the dot matrix type, one direction of a two-dimensional symbol such as a character is generated by repeatedly sweeping a dot forming means. The second dimension of the character is generated as a result of a continuous relative movement between the dot forming means and the print medium in the direction transverse to the sweep direction. Character definition is obtained by selectively preventing dots from being formed during selected sweeps or portions of sweeps. In an ink jet printer, a dot forming means comprises a jet forming nozzle which projects a stream of field controllable ink drops toward the print medium during said relative motion. The drops are deflected in the first dimension by field deflection means, which is repeatedly rastered during said relative motion in the second dimension. As a result of the relative motion, the characters are slanted from the vertical unless corrected. In a case where printing is to be done in two opposite directions of relative motion with no slant correction, the characters are slanted in opposite directions on successive print lines. This dual slanting presents an undesirable appearance and affects readability.

One form of slant correction is to physically orient the dot forming means and/or the drop deflection means in the case of the ink drop printers at an angle tilted relative to the line of travel and/or the vertical direction. Various methods for achieving this can be seen by reference to U.S. Pat. Nos. 3,651,588; 3,596,276; 3,813,676 and 3,895,386. Another method in an ink jet printer for slant correction is to apply a compensating field which in the case of the U.S. Pat. No. 3,938,163 involves additional electrodes located in advance of the deflection electrodes which are maintained parallel with the direction of relative motion.

In the prior art, slant correction in the characters is provided only when printing in a single direction. Slant correction using the above techniques cannot be readily practiced if it is desired to print dot matrix characters in two directions of relative motion. Consequently, speedrate advantages obtained from bi-directional printing are not available and the undesirable results of having some rows of characters vertical and others slanted or alternate lines of characters slanted in opposite directions may be avoided only by use of special mechanisms or field structures or both.

SUMMARY OF THE INVENTION

Accordingly, it is a general object of this invention to provide an improved serial matrix line printer of the rastering type, which is capable of bi-directional printing in which the characters in all lines are either vertical in slanted in the same direction if desired.

It is a still further specific object of this invention to achieve the above objects in a magnetic ink jet printer, which prints in two directions of a print line.

It is a still further object to achieve the above objects without the use of additional mechanisms or field producing structures.

Basically, the above as well as other objects of this invention are achieved in accordance with this invention by reversing the sequence or direction of rastering of the dot producing means when the direction of motion reverses. In the case of ink jet printers, the field deflection means used for rastering signals is energized by a sweep or raster signal whose direction is reversed each time the direction of relative motion between the jet forming means and the print medium is changed. For printing in the preferred embodiment, the deflection field means is also tilted with respect to the print line to compensate for slanting caused by the relative motion in the second direction. The tilt of the field deflector remains the same for printing in the reverse direction and only the direction of the rasters can signal is reversed. Thus the characters printed in opposite directions on successive lines will be vertical. The reversal of the raster scan signal is readily obtained and requires a minimum of electrical components to accomplish. Thus, the need for reversing the tilting of the field deflection means is avoided and mechanisms to accomplish this, therefore, become unnecessary. Also, since only the raster signal applied to the deflection means is reversed, the addition of field compensating means and associated devices is avoided.

The foregoing and other objects, features and advantages of the invention will be apparent from the following more particular description of preferred embodiments of the invention, as illustrated in the accompanying drawing.

DETAILED DESCRIPTION OF THE INVENTION

Figure 1:
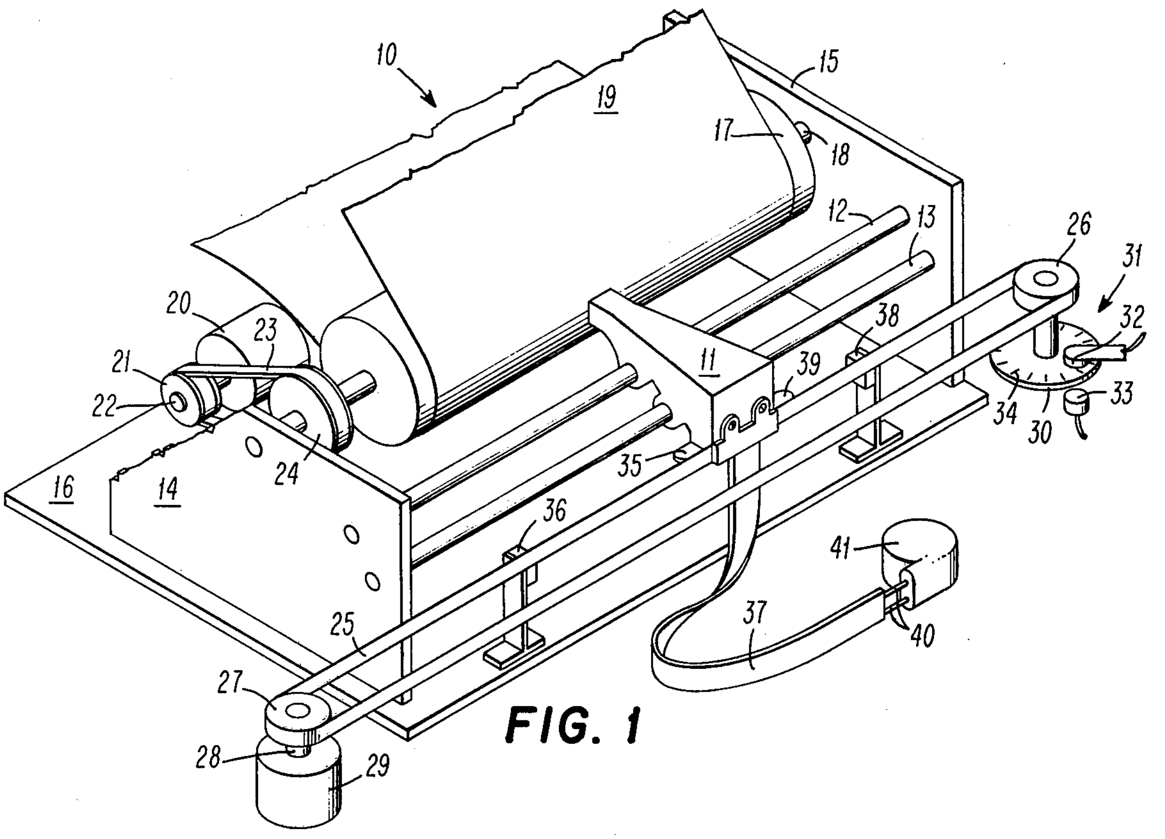
FIG 1 is an isometric view of a serial ink jet printer incorporating the features of the invention.

As seen in FIG. 1, a serial line printer 10 for printing dot matrix symbols comprises ink jet print head assembly 11 journaled to move along rails 12 and 13. The rails 12 and 13 are rigidly fixed to vertical side plates 14 and 15 attached to horizontal baseplate 16. A cylindrical platen 17 has a shaft 18 rotatably supported between the vertical side plates 14 and 15. Platen 17 supports a print medium such as paper 19 in position to have characters recorded thereon in lines of print extending over all or a portion of the width of the paper. A paper feed motor 20 is mounted to base plate 16. A belt 23 connects pulley 21 on shaft 22 of drive motor 20 to pulley 24 on shaft 18 of platen 17. Controls (not shown) operate motor 20 to cause platen 17 to rotate in increments to feed paper 19 one or more lines at a time, as is well known in the art. At the end of printing all or a part of a line of characters by print head 11, motor 20 is activated causing paper 19 to be advanced to the next print line position.

A toothed belt 25 of rubber or similar material is secured to print head assembly 11. Belt 25 passes over idler roller 26 and drive roller 27 at ends of the printer 10. Drive roller 27 is attached to shaft 28 of a stepper motor 29. In the preferred embodiment of the invention motor 29 is a d-c stepper motor of the variable reluctance type energized with a polyphase energization to obtain precise increments of motion in order to move print head assembly 11 along rails 12 and 13 over a distance corresponding to the print line to be recorded on paper 19. An emitter wheel 30 connected to idler roller 26 is rotated during motion of the print head assembly 11. An emitter sensor 31 comprising a light source 32 and a photocell 33 senses slots 34 or other indicia on emitter wheel 30 to generate timing pulses for controlling the printing of characters. The slots 34 are uniformly spaced around wheel 30 so that each slot 34 corresponds with each increment of motion of the print head assembly 11 defining the spacing of the strokes or columns of dots of the dot matrix characters recorded in a line of print. A flag 35 attached to print head assembly 11 operates a left limit switch 36 located on baseplate 16 at the desired leftmost position of travel of the print head assembly. A flag 39 attached to the print head assembly 11 operates limit switch 38 located on baseplate 16 at the desired rightmost position of travel of the print head assembly 11. The limit switches 36 and 38 can be adjustably mounted on the baseplate 16 so that left and right home positions can be modified to accommodate various sizes of paper 19. Flexible cable 37 is connected to the print head assembly. Cable 37 would include the electrical connections which are made to the ink jet head for the production and control of the ink jet stream and the ink drops thereof. At its free end, cable 37 may be connected to a terminal block or the like (not shown) for connection to the logical control circuits and other external control devices to be described hereinafter. Also included in the cable 37 are flexible tubes 40 for conducting the liquid ink under pressure from pump 41 to the print head assembly 11 and returned.

Figure 2:
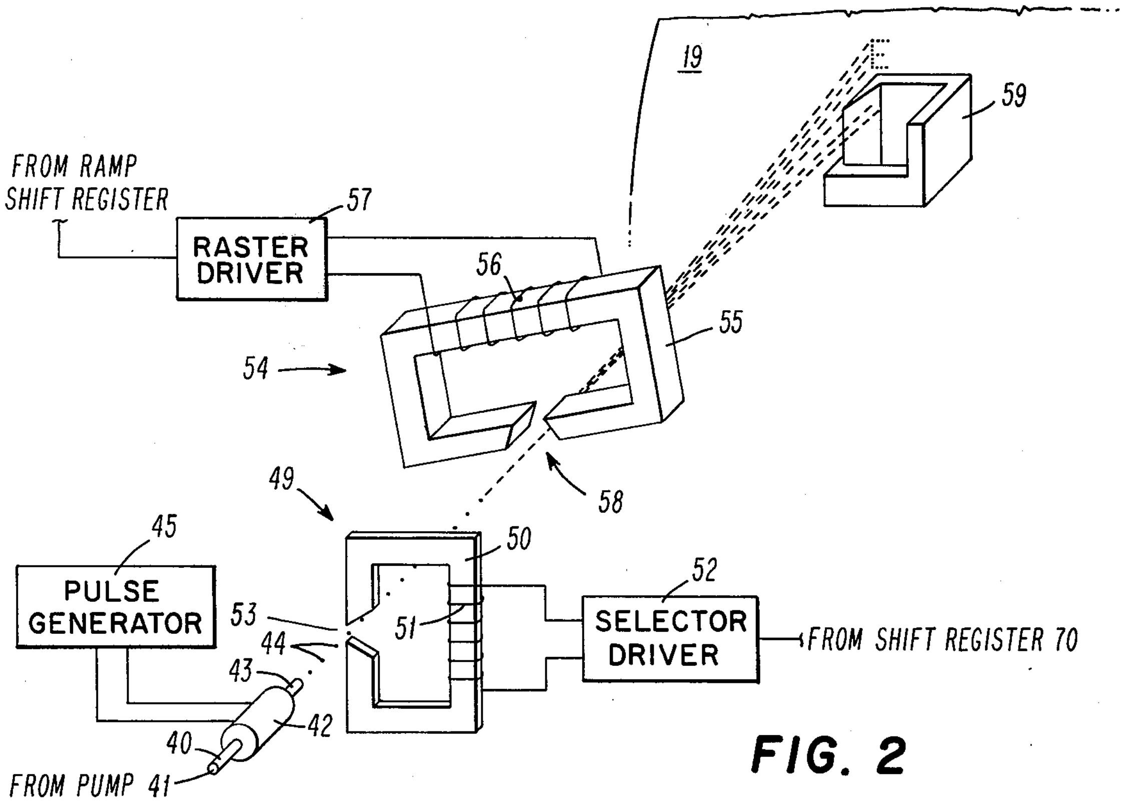
FIG. 2 is an exploded isometric view of the ink jet head portion of the printer of FIG. 1.

As seen in FIG. 2, the print head assembly 11 of FIG. 1 comprises a drop generating transducer 42 attached to nozzle 43, which is connected through tube 40 to the pump 41. The ink is preferably a ferrofluid of any well known type. Ink is maintained under pressure by pump 41 in order to project a continuous stream of ink drops 44 toward paper 19. Transducer 42, which may be a piezoelectric or magnetostrictive vibrator, is energized at a selected constant frequency by a pulse generator 45 to cause the ink stream to break up into individual, uniformly-spaced ink drops 44.

For printing characters or other data symbols, certain ink drops 44 are not used. The unused drops are selectively deflected from the initial trajectory in a horizontal direction, i.e. parallel to the direction of motion of the print head 11, where they are ultimately intercepted by an ink drop collector 59 located downstream in front of paper 19. Magnetic selector 49 comprises a magnetic core 50 energized by a winding 51 which is connected to a selector driver 52. A tapered gap 53 is formed in magnetic core 50 to produce a non-uniform magnetic field in the vicinity of the gap. In the preferred embodiment of this invention, core 50 is located so that ink drops 44 pass in the vicinity of gap 53 external to core 50. The core 50 has a width substantially less than the wavelength between drops 44. Thus, as winding 51 is pulsed by data signals from the drop selector driver 52 in synchronism with the arrival of drops 44 at the gap 53, a deflection force is applied to the aligned drops causing them to be displaced in the horizontal direction. Drops 44 not selected by the synchronized pulsing of winding 51 continue to move on the initial trajectory for deposition as elements or dots of columns of dots for characters recorded on print medium 19.

Downstream from the magnetic selector 49 is a vertical deflector 54. The vertical deflector 54 operates to raster or sweep ink drops 44 orthogonal to the direction of motion of the print head assembly 10 so that ink drops 44 not directed to collector 59 become deposited as a column of dots (with or without spaces) on record medium 19. Vertical deflector 54 comprises a magnetic core 55, and a winding 56 connected to a raster scan driver 57. Ink drops 44, both print and unused, fly through a tapered gap 58 in the core 55. During the interval the ink drops 44 are within gap 58, they are deflected vertically in accordance with the raster scan signal applied to winding 56 by raster scan driver 57. The degree of deflection depends on the time and the shape of the raster signal. The raster scan signal may be a sawtooth ramp or a staircase signal.

Figure 3:
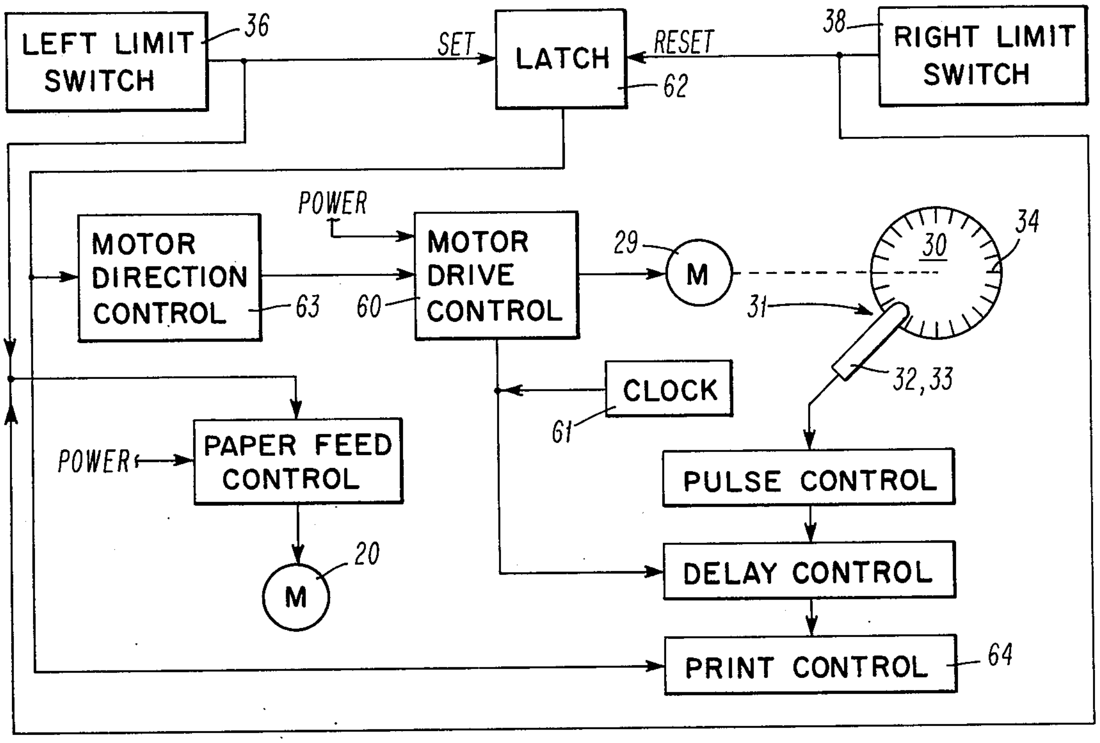
FIG. 3 is a block diagram schematic of the motor feed control for the printer of FIG. 1.

As previously stated, this invention provides for printing in both directions of motion of the print head assembly 11 relative to paper 19 when printing successive lines of print information. That is, printing occurs when stepper motor 29 is operated to move print head 11 from left to right after which flag 39 activates limit switch 38 and then from right to left until flag 35 activates limit switch 36 and so on. The controls for producing reciprocating or bi-directional motion of print head 11, as seen in the schematic of FIG. 3, comprise motor drive control 60 operable to provide sequence energization of the windings of the rotary stepper motor 29 when driven by timed pulses from clock 61 to provide precisely timed steps of operation of the motor 29. The motor drive control 60 could be any known type of rotary stepper motor control which includes acceleration and deceleration of the motor 29 at opposite ends of the print line with constant motor velocity maintained during the print portion of the line, as is well known in the art, and may, if desired, utilize feedback pulses from emitter 31. A direction latch 62 connected to the left and right limit switches 36 and 38 applies direction control binary signals to the direction control circuitry 63, which operates to reverse the sequence in which the motor drive circuits 60 energize the windings of the rotary stepper motor 29. The output of binary direction latch 62 is also connected to the print control 64, which operates the selector 49 for deflecting unwanted drops into gutter 59 and deflector 54 for rastering the ink drops 44 for deposition on paper 19. The binary state of the direction latch 62 is the basis on which the direction of the motor and the print control operates. Operation of the left limit switch 36 by flag 35 (see FIG. 1) sets latch 62 to the one state causing rotary stepper motor 29 to move print head assembly 11 from left to right when printing is called for by the external control. Operation of the right limit switch 38 by flag 39 (see FIG. 1) resets direction latch 62 to the zero state and causes the rotary stepper motor 29 to move the print head 11 in the right-to-left direction when a print command signal is received from the external control. The pulses from pickup 33 and emitter disk 34 of emitter 31 are used with timing from clock 61 (see FIG. 3) to synchronize the print control 64 and motor 29 to get accurate horizontal placement of each stroke of ink drops by deflector 54.

Figure 4:
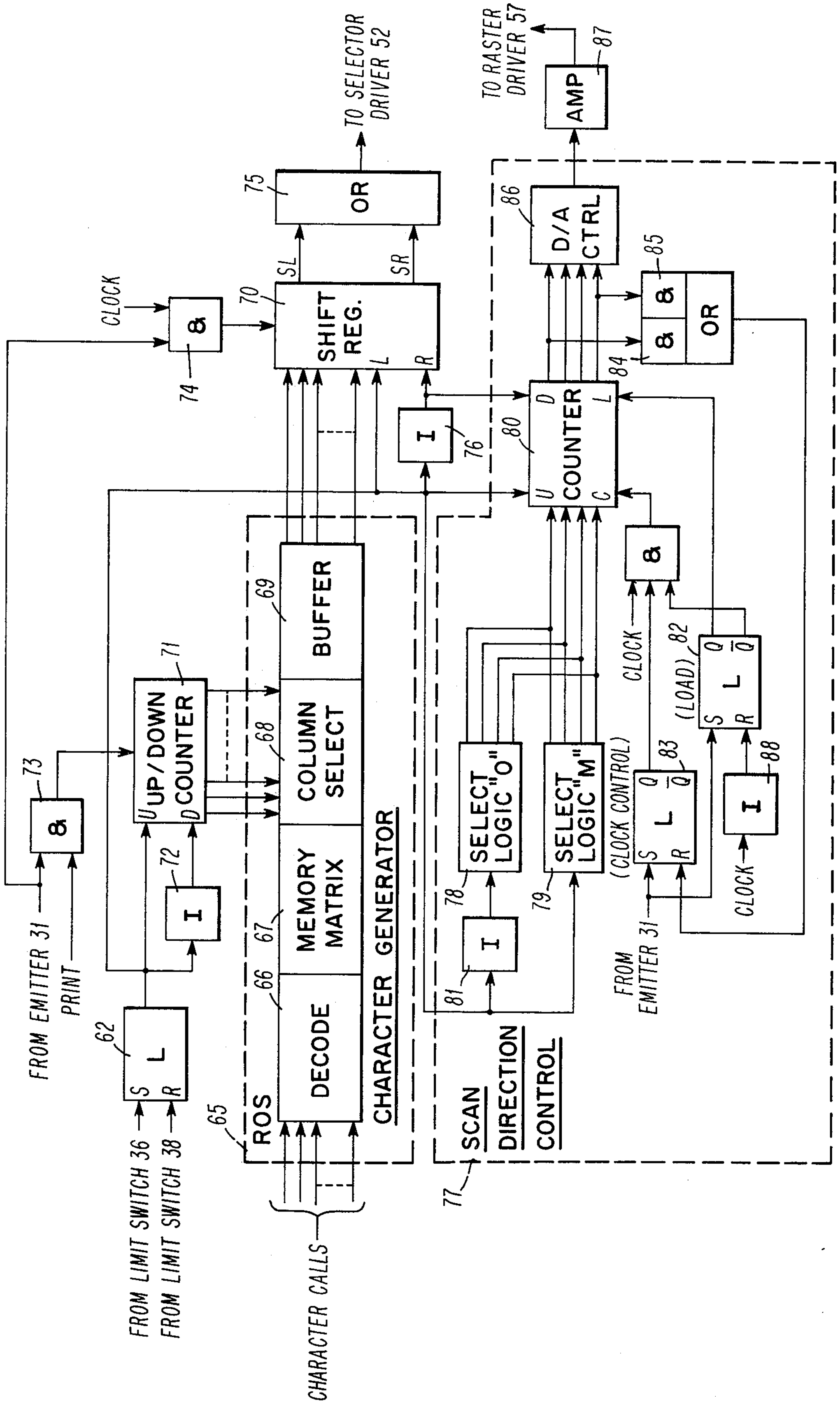
FIG. 4 is a logic diagram for the print control portion of the block diagram of FIG 3.

As seen in FIG. 4, the print control portion of FIG. 3 comprises a character generator means which applies pulses to the selector driver 52 and a sweep signal means for driving the raster driver 57. The character generator means preferably comprises a read only storage (ROS) 65 in which the dot pattern for each character is stored by character code and column code selection. A character signal is converted by decode 66 to a memory address and applied through a memory matrix 67 to the memory location where the dot pattern of the particular character is located. The dot pattern which may be a series of binary bits is read out of the memory column by column by a column select 68 controlled by counter 71 into buffer 69. The buffer 69 is a memory output register which will contain the column bit information of the desired select line and transfers the selection to shift register 70. Since in this invention printing occurs in both directions of travel of the print head 11, the order of the columns of the dot pattern must be reversed. For this purpose, an up/down counter 71 is provided which has its counting direction reversed in accordance with changes in the direction of motion. Direction control to up/down counter 71 is provided by connection of the output of the direction latch 62 directly to the UP input and through inverter 72 to the DOWN input of counter 71. Thus, when limit switch 36 is activated by flag 35 on print head assembly 11 to set direction latch 62 to the one state, counter 71 counts up one step at a time for each pulse from emitter 31 gated through AND circuit 73 by an external PRINT command. When limit switch 38 is operated by flag 39 on print head assembly 11 to reset direction control latch 62, to the zero state, counter 71 is stepped down by pulses from emitter 31 gated through AND circuit 73 by a PRINT command. As previously stated, after each column bit pattern is read out by operation of counter 71 of column select 68 of ROS 65 into buffer 69, and loaded into shift register 70, the column bit pattern is then serially read out of the shift register 70 by clock pulses gated through AND circuit 74 by pulses from emitter 31 through OR gate 75 to selector driver 52 which applies a sequence of selection pulses corresponding to the column bit pattern to the winding 51 of selector 49 in synchronism with the flight of ink drops 44 past selector 49 as previously described. The direction of the bit pattern readout from shift register 70 and hence the sequence of selection pulses is also under control of the direction latch 62 connected directly to the Shift Left input and through inverter 76 to the Shift Right input of shift register 70.

In the preferred embodiment in which this invention is practiced in the form of a magnetic ink jet printer, the rastering of ink drops 44 in the vertical direction during the uninterrupted motion of print head 11 along the print line is obtained by applying ramp signals to deflector 54 under control of timing pulses from the scan direction control 77. The scan direction control 77 is a logical function which provides staircase functions the direction of the staircase depending on the direction of carrier motion. If carrier 11 is moving from left to right, scan direction 77 control provides a staircase function which is monotonically increasing. If the carrier 11 is moving right to left, the scan direction control provides a staircase function which is monotonically decreasing. The scan directional control 77 consists of select logic 78 and 79 to provide the counter 80 with the correct count for counting the number of dots/raster. Select logic 79 provides an input to counter 80 to count from O to M when latch 62 activates select logic 79 and the up line of counter 80. Select logic 78 provides an input to counter 80 to count in the reverse direction, i.e. from M to O when latch 62 through inverter 81 activates select logic 78 and the down control line of counter 80 through inverter 76. Scan direction control 77 also contains a load latch 82, a clock control latch 83, decode logic 84 and 85, a digital-to-analog control 86 which feeds into an amplifier 87. Load latch 82 is activated by emitter 31 and reset by block pulses through inverter 88. The Q output of latch 82 allows the counter 80 to be loaded during a period when the clock is down and counter 80 is not counting. Clock control latch 83 is activated by emitter 31 which allows the clock to step counter 80, if load latch 82 is not activated. Counter 80 output lines are decoded by decode M, 84 or decode O, 85, and inhibits the counting by resetting the clock control latch 83. The output lines of counter 80 provide the data to the input lines of the digital-to-analog control logic 86. The output of the digital-to-analog control 86 is a weighted current proportional to the binary count on the input lines. The output current line of the digital-to-analog control 86 is converted to a voltage by the current-to-voltage amplifier 87. The resultant output of amplifier 87 is provided to the input of raster driver 57. The direction of the ramp signal to correspond with the direction of printing is under the control of the direction control latch 62 whose output is connected directly to the up input and through inverter 76 to the down input of ramp shift register 70. Thus, it is seen that when limit switches 36 and 38 are operated as previously described, direction latch 62 operates to control the direction of operation of the stepper motor 29, the order of readout of the character column bit patterns located in ROS 65, the order of energization of the dot selector 49, and the direction of the ramp signals applied to the deflector 54 for rastering ink drops in the up/down direction or vice versa.

Figure 6:
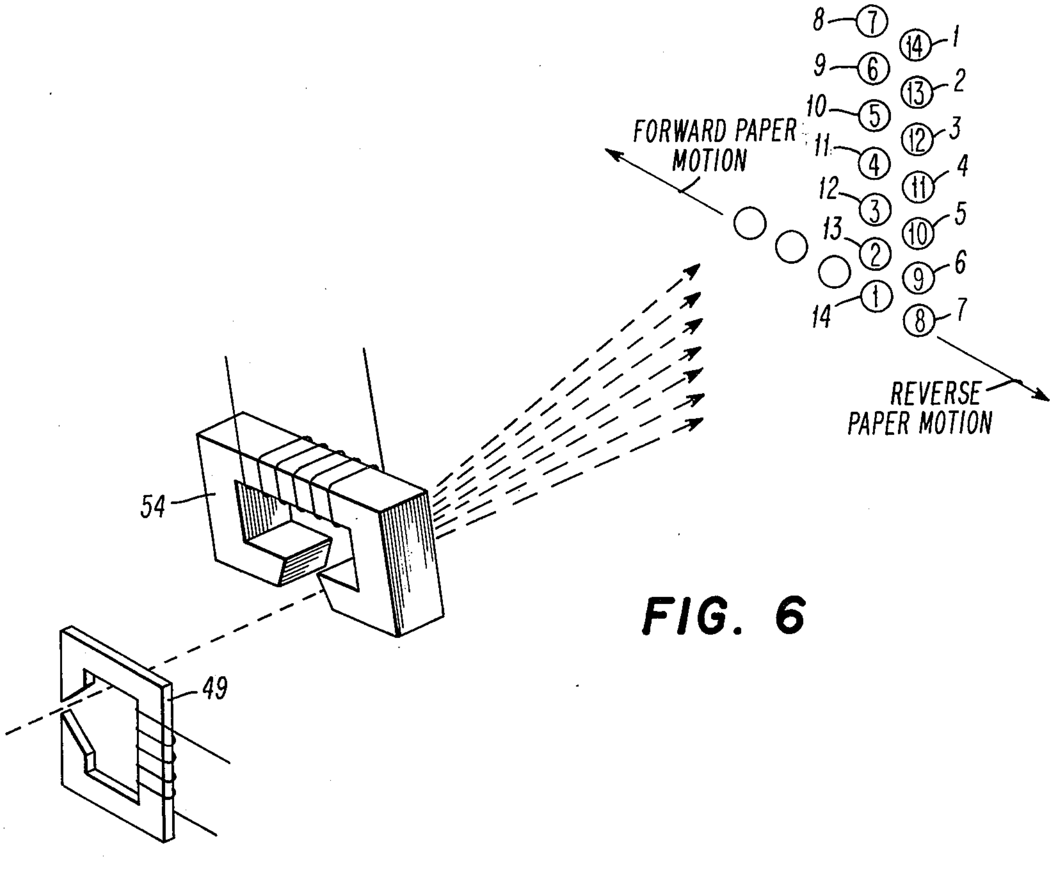
FIG. 6 is a graphic illustration showing the order of drop deposition for the two directions of rastering.

FIG. 6 shows the sequence for rastering drops for the two directions of motion for two successive columns of a dot matrix. The arabic numerals in the dot circles show the sequence of rastering to be upward for dot positions 1–7 and 8–14 for a matrix having a character stroke 7 dots high when relative motion occurs in the left-to-right direction. For printing in the right-to-left direction the ramp signal for each dot column is reversed and rastering occurs top to bottom changing the sequence for rastering drops from top to bottom as shown by the numerals outside the dot circles.

In addition to reversing the direction of the ramp signal to reverse the direction of rastering of ink drops 44, deflector 54 is tilted relative to the vertical direction to print character which are vertical in both directions of printing. This may be seen in FIG. 5 where angle $\theta$ is the tilt angle for deflector 54 relative to the line of motion 78. Selector 49 and gutter 59 preferably would likewise be tilted the same angular amount, since the elements are all part of a common assembly. The magnitude of tilt angle $\theta$ is dependent upon the resolution of printing, the height of the swath of printing, and the number of drops emitted per vertical raster. As the drops for a raster are emitted and the vertical raster is formed, the head must move one raster space over the paper. Where angle $\theta$ is zero and only the order of the selection signal and the direction of raster scan signal are reversed, the slant of characters is obtained the same for printing in both directions.

Figure 5:
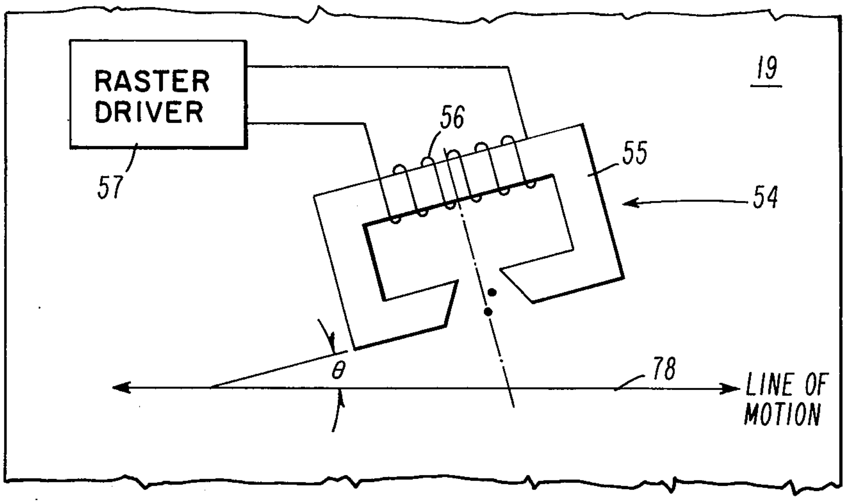
FIG. 5 is a fragment showing the tilt of the deflector portion of the print head assembly of FIG. 2.

While the preferred embodiment of practicing this invention has been illustrated as a magnetic ink jet printer and the rastering signal is applied to the magnetic deflector, the invention could readily be adapted for application in an electrostatic ink jet printer. The rastering of the deflection electrodes which are maintained at a tilt angle $\theta$ similar to the angle of tilt of deflector 54, as shown in FIG. 5, could also be used. Alternatively, the rastering of the ink drops can be obtained by reversing the sequence of deflection of charged drops. This would involve reversing the drop charging ramp applied to the charging tunnel or charging electrode located in advance of the deflection electrodes, which have a fixed potential applied thereto.

In a further embodiment, the reverse rastering may be applied to multiple dot forming means which can be either a single row of wire elements or ink drop nozzles which generate drops on demand. In that case, the array of print wires or nozzles is slanted from the vertical away from the left-to-right direction of motion. The rastering of the print wires or ink jet nozzles then would occur upward when motion is from left to right and downward when motion is from right to left.

In all of the embodiments the print controls and the direction control is substantially the same as shown for the magnetic ink jet printer embodiment in which only a single ink jet nozzle is used.

Further, while limit switches located at the ends of the print line are used for determining directional changes, other devices and techniques may be used for the purposes contemplated by the invention. Also, while the invention is illustrated for printing successive lines in opposite directions, the invention may be practiced where one or more partial lines may be printed in the same direction before reversal takes place such as shown in U.S. Pat. No. 3,764,994 issued to E. G. Brooks, et al on Oct. 9, 1973.

Thus, it will be seen that a relatively simple means is provided for compensating for the undesirable slanting of characters in a bi-directional serial dot matrix printer without utilizing complex mechanisms or additional field control elements.

While the invention has been particularly shown and described with reference to preferred embodiments thereof, it will be understood by those skilled in the art that the foregoing and other changes in form and details may be made therein without departing from the spirit and scope of the invention.

We claim:

1. An ink jet printer apparatus comprising print head including means for projecting a constant stream of field controllable ink drops toward a print medium;

means for effecting continual relative motion of said print head and said print medium, said motion occuring first in one direction and then in an opposite second direction;

means for controlling printing of characters by said print head on successive print lines when printing in both said first and second directions of motion comprising deflection means included in said print head for deflecting ink drops of said stream in a direction orthogonal to said direction of relative motion to produce columns of dots forming matrix characters recorded on said print medium, and slant control means for correcting for slanting of said characters due to deflection of said ink drops during said relative motion in both said first and second directions, including direction determining means for indicating direction of said relative motion, and means responsive to direction reversal indications from said direction determining means for effecting a reversal in the sequence in which said ink drops are deflected by said deflection means in said orthogonal direction in correspondence with reversals in the direction of said relative motion.

2. An ink jet printer apparatus in accordance with claim 1 in which said deflection means for deflecting ink drops is tilted relative to the direction of said relative motion the tilt of said deflection means being unchanged for printing in said first and secondary directions of relative motion.

3. An ink jet printer apparatus in accordance with claim 2 in which said unchanged tilt of said deflection means in contra said first direction and toward said second direction of said relative motion.

4. An ink jet printer apparatus in accordance with claim 1, in which, said means for controlling printing characters in said first and second directions further includes, selector means in said print head for selectively removing individual ink drops from said stream in synchronism with the flight of said drops toward said print medium, means for operating said selector means with patterns of selection signals representing dot patterns for said columns of dots forming matrix characters being printed, means for applying raster scan signals to said deflection means for rastering ink drops in said orthogonal direction to form said columns of dots during said relative motion, and said slant control means further includes means responsive to direction reversal indications from said direction determining means for reversing the sequence of the pattern selection of said signals and the direction of said raster scan signals in correspondence with said reversals in the direction of said relative motion.

5. An ink jet printer apparatus in accordance with claim 4, in which said field controllable ink drops are ferrofluid ink drops;

said selector means includes a magnetic field transducer and means for selectively energizing said transducer for diverting individual ink drops to an ink drop collector located in advance of said print medium;

said deflection means includes a magnetic deflector for deflecting said ink drops of said stream in said orthogonal direction;

said means for controlling said printing comprises means for applying said pattern selection signals to said magnetic transducer;

means for applying said raster scan signals to said magnetic deflector; and said means for controlling slant of characters comprises means for reversing the direction said raster scan signals applied to said magnetic deflector, and means for reversing the sequence of said patterns of selection signals applied to said magnetic field transducer.

6. An ink jet printer apparatus in accordance with claim 4, in which said means for operating said selector means with said patterns of selection signals comprises:

storage means for storing character data in a column-by-column dot pattern format, storage readout means for reading out said character data column-by-column, conversion means for converting said character data into said patterns of selection signals in correspondence with said dot patterns for application to said selector means and said means responsive to direction reversal indications including means for reversing the order of said column-by-column read out by said storage read out means, and means for reversing the sequence of said pattern of selection signals representing the reversal in said dot patterns.

7. An ink jet printer apparatus in accordance with claim 6, in which said character data takes the form of binary bit patterns stored column-by-column, said storage read out means comprises an up/down counter means connected for addressing successive column positions of said storage means in ascending or descending order, and said conversion means includes a bidirectional shift register device for storing column binary bit patterns read out of said storage means in accordance with the direction of operation of said counter means, and said means for reversing the sequence of said patterns of selection signals applied to said selector means comprises, means for reversing the shift direction of said binary bit patterns from said shift register.

8. An ink jet printer apparatus in accordance with claim 7 in which said means for controlling printing of characters in said first and second directions further includes, timing means for applying timing signals to said up/down counter device, said shift register and said raster scan signal means in synchronism with said relative motion, said timing pulses occurring for each increment of motion corresponding with the spacing of a dot column of said dot matrix characters.

9. An ink jet printer apparatus in accordance with claim 7, in which said direction determining means comprises sense means for sensing the location of said print head at the extremeties of a line of print to be recorded on said print medium, and means responsive to location sense signals produced from said sense means for controlling the direction of operation of said up/down counter means and the shift direction of said shift register.

10. An ink jet printer apparatus in accordance with claim 9 in which, said sense means comprises limit switches located in the vicinity of opposite extremities of a line of print, and said means for controlling the direction of operation of said up/down counter and the shift direction of said shift register comprises a bistable latch operable to change bistable state in accordance with operation of said limit switches, said change in state of said bistable latch operating to reverse the direction of operation of said counter and said shift register.

11. An ink jet printer apparatus in accordance with claim 10 in which said change in bistable state of said bistable latch further operates to reverse said raster scan signals applied to said ink drop deflection means.

12. An ink jet printer apparatus in accordance with claim 11 in which said direction determining means further comprises switch operator means associated with said print head for activating said limit switches upon location of said print head in the vicinity of the extremities of said line of print.

13. A dot matrix printer apparatus capable of bi-directionally printing successive lines of characters using relative motion between a print medium and a print means, said print means comprising means for sequentially recording a line of dots orthogonal to the direction of said bi-directional motion, means for controlling the operation of said print means for recording characters in the form of a plurality of said lines of dots during said bi-directional relative motion including slant correction means for correcting for slanting of said lines of dots due to said relative motion in both directions including, direction determining means for indicating the direction of said relative motion during said recording of said lines of dots, and means responsive to direction indications from said direction determining means for reversing the sequence for recording dots to form lines of dots in correspondence with reversals in the direction of said relative motion.

14. A dot matrix printer apparatus in accordance with claim 13 in which said print means is tilted relative to said direction of relative motion, the tilt of said print means being unchanged for bidirectionally printing successive lines of characters.

* * * * *